Patented May 6, 1930

1,757,829

UNITED STATES PATENT OFFICE

VIKTOR BERTLEFF, OF ZILINA, CZECHOSLOVAKIA

PICKLING OF METALS

No Drawing. Application filed June 27, 1928, Serial No. 288,799, and in Austria July 9, 1927.

The present invention refers to an improved process for pickling metals and to pickling baths used therefor. The improved process consists essentially in dipping the metal into a pickling bath formed of a mixture of the pickling liquor with reaction products obtained by heating coal-tar oils having their boiling point above 150° C. with a nearly equal weight of sulfuric acid until complete solubility in water has been attained.

It is to be noted that in the improved process the sulfuric acid—this term including ordinary concentrated sulfuric acid, monohydrate, and fuming sulfuric acid—is used in a proportion not exceeding the weight equal to that of the substance to be sulfonated. The substance to be sulfonated may be a liquid distillate from coal-tar, such as the middle oil, the heavy oil or anthracene oil, and the sulfonated product consists in the main of water-soluble mono-sulfonic acids of aromatic compounds. The process of sulfonation consists in running the sulfuric acid as quickly as possible into the oil so that a reaction temperature of about 100° C. is produced, whereupon the operation is completed by further heating to about 125° C.

For example, into 100 parts by weight of filtered anthracene oil there are run quickly, while stirring, 95 parts of concentrated sulfuric acid containing about 96 per cent. of $H_2SO_4$, so that the temperature rises to about 100° C., whereby the main quantity of the oil is already sulfonated. The temperature is now raised to about 125° C. and the whole is stirred until a sample dissolves clearly in water. In this manner there is obtained at once a somewhat concentrated preparation which at the pickling works is dissolved in water and added to the pickling bath. Or the aqueous solution of the product may be used to dilute the concentrated acid in making the pickle.

A further improvement of this process consists in subjecting an anthracene oil residue, the boiling point of which lies over 300° C. to the sulfonation.

For example, into a reaction vessel protected against loss of heat, containing 100 parts by weight of anthracene oil residue the boiling point of which lies above 300° C., there are run quickly, while stirring well, 95 to 100 parts of concentrated sulfuric acid containing about 96 per cent. of $H_2SO_4$, so that the temperature rises to about 90° C. While maintaining the temperature at about 80–90° C. stirring is continued until a sample dissolves clearly in water. The reaction product, brought with an indifferent diluent, such for example as water, to a content of 25 per cent. in respect of oil used, has the same efficiency as a product with an oil content of 50 per cent. made from normal anthracene oil.

As additions to the pickling-baths there may also with advantage be used in place of the crude sulfonation products the salts thereof or the purified sulfonic acids.

For example, the sulfonation mixture from 100 parts by weight of anthracene oil and 95 parts by weight of concentrated sulfuric acid is diluted with 1000 parts by weight of water, the whole heated to boiling and then neutralized with milk of lime of 25 per cent. strength, of which about 950–1000 parts by weight are necessary. After filtering from the precipitated calcium sulfate the clear liquor is concentrated by evaporation, if necessary to dryness. The calcium salt thus obtained is suitable as an addition to the hydrochloric acid pickling bath. Or to the solution of the lime salt, sodium carbonate may be added, the precipitated calcium carbonate filtered and the clear liquor evaporated, if necessary to dryness. The sodium tar-oil sulfonate is applicable as an addition to all usual pickling baths and may be added in aqueous solution to the bath or the aqueous solution of the salt may be used for diluting the concentrated acid to the degree of acidity suitable for pickling. Still more concentrated additions for use in the pickling bath may be obtained by preparing the free sulfonic acid free from sulfuric acid, for instance by mixing the suitably diluted sulfonation mixture with such a quantity of barium hydroxide as may be necessary for precipitating the free sulfuric acid and then filtering from the barium sulfate the aqueous solution of sulfonic acids; the latter may be concentrated by evaporation, or by preparing the sulfonic acids according to known chemical methods by way of the calcium or lead salt.

In an analogous manner also the sulfonation mixture obtained from anthacene oil residue the boiling point of which lies above 300° C. may be worked up to sulfonic acid salts or purified sulfonic acid. These are also suitable as additions to pickling baths.

What I claim is:—

1. Process for the pickling of metals, consisting in preparing a pickling bath from a pickling liquor and reaction products obtained by heating coal-tar oils having their boiling point above 150° C. with a nearly equal weight of concentrated sulfuric acid until complete solubility in water has been attained, and dipping the metal into the so obtained pickling bath.

2. Process for the pickling of metals, consisting in preparing a pickling bath from a pickling liquor and reaction products obtained by heating anthracene oil residues having their boiling point above 300° C. with a nearly equal weight of concentrated sulfuric acid until complete solubility in water has been attained, and dipping the metal into the so obtained pickling bath.

3. A new pickling bath for metals prepared from a pickling liquor and reaction products obtained by heating coal-tar oils having their boiling point above 150° C. with a nearly equal weight of concentrated sulfuric acid until complete solubility in water has been attained.

4. A new pickling bath for metals prepared from a pickling liquor and reaction products obtained by heating anthracene oil residues, the boiling point of which lies above 300° C. with a nearly equal weight of concentrated sulfuric acid until complete solubility in water has been attained.

In witness whereof I have hereunto signed my name this 13th day of June, 1928.

VIKTOR BERTLEFF.